Feb. 25, 1969     Z. M. SHAPIRO     3,429,295

APPARATUS FOR PRODUCING VAPOR COATED PARTICLES

Filed Sept. 17, 1963

# United States Patent Office 3,429,295
Patented Feb. 25, 1969

3,429,295
APPARATUS FOR PRODUCING VAPOR
COATED PARTICLES
Zalman M. Shapiro, Pittsburgh, Pa., assignor to Nuclear
Materials and Equipment Corporation, Apollo, Pa., a
corporation of Pennsylvania
Filed Sept. 17, 1963, Ser. No. 309,446
U.S. Cl. 118—49.1          5 Claims
Int. Cl. C23c 13/02

ABSTRACT OF THE DISCLOSURE

Apparatus for coating particles 10 in which the particles are disposed in a rotating receptacle 80 and are moved up the walls 79 of the receptacle by centrifugal force. The walls of the receptacle 80 are bathed in vapor from coating material from a crucible 100 within the receptacle. The particles are circulated from the walls 79 through conduit 108.

---

Figure 1:
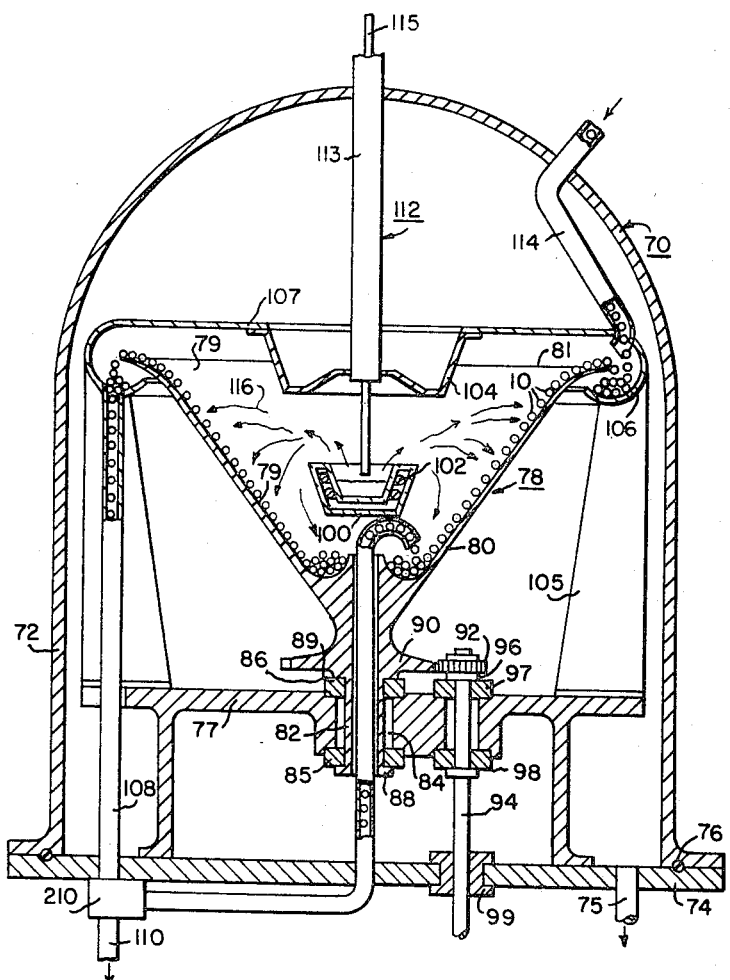

This invention relates to the art of coating materials and has particular relationship to the coating of particles with uniform coatings.

In its specific aspects this invention concerns itself with the coating particles of fissionable materials which serve as fuel for nuclear reactors with protective sheaths or cladding. The cladding prevents contact of the fuel with the heat-exchange fluid suppressing reaction of the fuel and fluid and corrosion of the fuel; the cladding also improves the dimensional stability of the fuel particles under irradiation. In its broader aspects this invention deals with the coating of particles of all types, typically the coating of molybdenum or tungsten particles to protect them against oxidation or the coating of particles to attain composite chemical or metallurgical surfaces.

The fuel with which this invention in its specific aspects concerns itself may be composed of uranium, thorium, plutonium, the compounds of uranium, plutonium, and thorium and alloys of uranium, thorium and plutonium with each other and/or with small quantities of other materials including the oxides, silicides, carbides, nitrides, sulfides, etc.

The cladding is usually composed of materials having a low neutron-absorbing cross section so that the cladding does not absorb the neutrons which produce the nuclear reaction. Such materials are zirconium and its alloys, (Zircaloy), aluminum, stainless steel, beryllium, niobium, etc. and their alloys. The thickness of the cladding is usually small and may be as small as several microns.

The particles which are to be coated or clad are usually spherical and of small diameter, between 80 and 200 mesh. There has been substantial demand for clad particles between 150 and 180 mesh. There has also been some demand for larger particles, for example, or radii as high as ⅛ inch and higher. The particles may be produced by shot-tower methods, by plasma jets and the like. Where it is not essential that the particles be spherical ball-mill methods may be used.

One of the advantages of a coated particle is that in an aggregate of such particles each particle has the coating precisely where it contributes to the required effect chemical or nuclear or other of the aggregate. To achieve this purpose effectively, it is necessary that the ratio of coating material to the coated material at each point be precisely controlled. In addition, to suppress non-uniform heating of a fuel element composed of clad particles during a reaction and the resulting formation of hot spots in the fuel, it is desirable that the cladding be of uniform thickness throughout the surface of each particle. It is an object of this invention to produce a method and apparatus for producing coated or clad fuel particles having cladding of uniform thickness.

In accordance with the teachings of the prior art coatings such as niobium can be produced by subjecting particles to be coated in a fluidized bed to halides and reducing the halides. But this method has been found not to be feasible for such important materials as zirconium alloys. In the case of some coating materials there are chemical and/or other reaction products which react adversely with the material being coated. For some coating material the reduction temperature is above the melting temperature of the material being coated so that the particles melt and agglomerate during the coating process.

Attempts have been made in accordance with the teachings of the prior art to produce coatings of such materials as zirconium alloys by subjecting the particles to vapor of the coating material in an evacuated space. Deposit from a vapor in a vacuum would allow deposition of coatings whose chemical and/or other reaction products of reduction react adversely with the material being coated or where the reduction temperature is above the melting temperature of the coating. But the particles coated in this way have been found to have coatings which are not of constant thickness or uniformity throughout the surface as required. In addition, particles coated in this way tend to agglomerate.

In addition prior art vacuum vapor coating has been of low efficiency since the coating vapor tends to diffuse in all directions while the particles are localized in one region or another of the vapor. The vapor of the coating material diffuses outwardly generally in a conical region with the surface of the coating material which is being vaporized as apex. It is usually difficult, if not impossible, to suspend the particles in the region where the vapor is predominately flowing. For example, attempts have been made to coat particles by depositing the particles on a vibrating plate above which the vapor is produced. It has been found that in a vacuum the coating vapor radiates from the source predominately above the plate and only a small proportion of the vapor becomes coating on the particles.

It is an object of this invention to overcome these deficiencies of the prior art and to provide a method and apparatus for producing particles having coatings of constant or uniform thickness with an efficient consumption of coating material. It is another object of this invention to provide apparatus and a method for producing coated particles by vapor deposition of the coatings on the particles, in the use and/or practice of which the particles shall be subjected to coating in regions where the vapor effectively impinges on the particles.

In accordance with this invention particles with coatings of uniform thickness are produced by rotating or rolling the particles in the vapor of the coating material. In accordance with the specific aspects of this invention the particles are deposited in a receptacle having an upwardly tapered internal surface. The surface is rotated or spun in the vapor causing the particles to roll along the surface in the vapor. As the particles roll the vapor is condensed in their exposed surfaces producing a uniform coating. The source of the vapor may be deep within the receptacle so that the vapor radiates from the source to the wall of the receptacle where it impinges on the particles rolling up the surface wall. The surface of the rotating receptacle may be cooled to suppress melting of the particles or heated as required. So that the particles may roll rather than slide the coefficient of friction of the surface for this material of the particles should be high. In accordance with the more specific aspects of this invention the surface should be roughened.

In a typical situation the receptacle is rotated in a vacuum-tight chamber in a vacuum or inert atmosphere and the vapor is supplied by vaporizing the coating within the chamber. This vaporization is not limited to metals or other atomic elements. Compounds such as metal oxides may be vaporized for coating purposes. The coating may be vaporized by heating the coating material by resistance or induction heating or by heating with an electron beam. A crucible can be used where applicable i.e. if the material is molten. This can be water cooled copper, graphite or ceramic. A high vacuum is generally employed to promote vaporization of the coating material and to maintain purity. The vapor may also be provided by an arc between an electrode composed of the coating material and a cooperative electrode which may also be of the coating material.

Among the more important advantages of the invention are the following:

(1) It lends itself to continuous or batch operation so that the necessity of breaking the vacuum and dismantling the apparatus is avoided.

(2) The particles are subject to the vapor from the coating material over a large solid angle as compared to the angle available in coating by prior-art practice as with a vibrating plate.

(3) The material being evaporated can be below rather than above the material coated and thus the dropping of melting coating material on the material coated is prevented.

Figure 2:
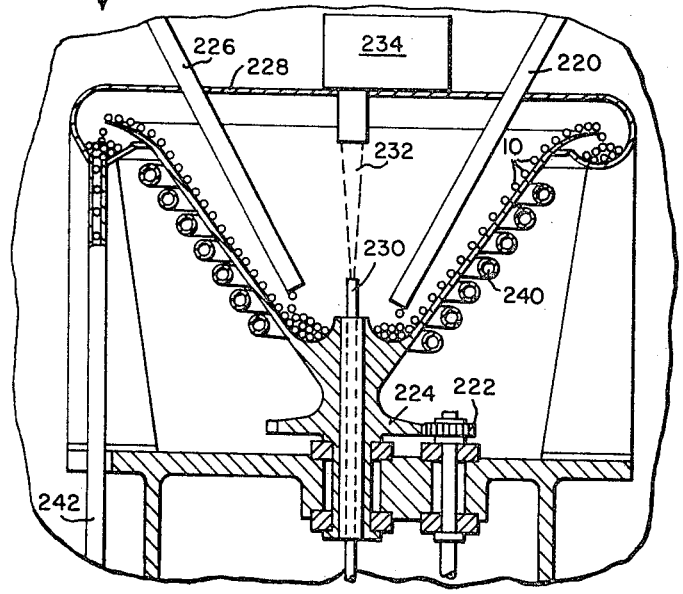

For a clearer understanding of this invention, both as to its organization and as to its method of operation, together with additional objects and advantages thereof, reference is made to the following description of specific embodiments taken in connection with the accompanying drawing, in which FIGURE 1 is a view in longitudinal section generally diagrammatic of an embodiment of this invention; and FIG. 2 is a like view of a modification of this invention.

FIGS. 1 and 2 are a section through a central plane of the apparatus which plane includes a central axis and the apparatus is circularly or cylindrically symmetrical about this axis.

FIG. 1 shows apparatus for coating particles 10 including a gas-tight chamber 70 having a hood 72, a base 74 and a seal ring 76 which is disposed between the hood and the base for sealing purposes. Communicating with the interior of the chamber is a conduit 75 through which gas may be withdrawn from or passed into chamber 72.

Disposed upon base 74 and attached thereto is a support frame 77 for a rotating conveyor 78 for the particles 10. Conveyor 78 includes a conical or bell shaped member or receptacle 80 having an extension or shaft 82 which passes through bore 84 in frame 77. The internal surface of the member 80 diverges or flares outwardly from the shaft 82. Shaft 82 is rotatably mounted upon bearings 85, 86 which cooperate with collars 88, 89 extending outwardly from the axes of the shaft. Located below conical member 80 and directly above collar 89 and integral with member 80 as shown, is a gear 90. The teeth of gear 90 mesh with the teeth on gear 92 which is carried by a drive shaft 94 extending through frame 76 and base 74. Shaft 94 is supported in position by collar 96 and bearings 97, 98 and 99. As is apparent, rotation of drive shaft 94 causes rotation of the conveyor 78.

Centrally disposed within conveyor 78 and located above the base thereof is a crucible 100. The crucible 100 is heated by a coil 102 disposed between the interior and exterior walls of the crucible. A bracket 104 depending from a particle receiving channel 106 supports the crucible. The crucible 100 should be suspended as near as practicable to the apex of the container 80. The channel 106 is affixed in position by means of a frame 105 which extends upwardly from frame 76 as shown. The channel 106 should be inclined to the vertical with the right-hand end (facing the drawing) at a higher level than the left-hand end.

Communicating with channel 106 and extending centrally through shaft 82 and into conveying means 78 is a conduit 108. In its lower portion the conduit 108 may be connected to a vertical-outlet conduit 110 through a vacuum-tight valve 210. This valve 210 is solenoid controlled. Normally this valve is closed; it may be opened to draw off coated particles when it is determined that the particles 10 are coated as required. To make this determination test specimens may be removed at intervals.

As the receptacle 80 rotates, the particles 10 are moved by centrifugal force upwardly along the inner surface of the conveyor. When the particles 10 reach the upper rim of the receptacle 80, they move into channel 106 and through conduit 108 back to conveying means 78 so long as the valve 210 is closed. The particles are thus repeatedly subject to coating. When valve 210 is opened, the particles are removed through a conduit 110 extending through base 74 and then communicating with conduit 108.

Extending into chamber 70 through the top of hood 72 are two additional conduits designated by numerals 112 and 114. Conduit 112 has an outlet located centrally above crucible 100. As shown, conduit 112 comprises an exterior casing 113 and an interior tube 115. This arrangement is used for feeding the charge of protective material to crucible 100.

The conduit 114 which also extends through hood 72 communicates with channel 106 at the higher end and serves as a particle inlet conduit. The particles 10 move into conduit 108 under gravity and thence into the apex of container 80.

The coating apparatus of the drawing is operated as follows: Drive shaft 94 is coupled to a suitable source of power (not shown), and serves to rotate conveyor 78. Particles to be coated are fed into chamber 70 via conduit 114, and pass through particle channel 106 and conduit 108 to the base or input end of conical or bell shaped conveyor 78. By centrifugal action, the particles roll up the interior face 79 of conveyor 78. To suppress sliding of the particles the coefficient of friction between the particles and the internal surface of bell 80 must be high. To increase this coefficient of friction the internal surface is roughened.

At the output end or the periphery 81 of the conveyor, they fly off the conveyor and into channel 106 which serves as a catch basin. The channel 106 is slightly tilted toward the communicating end of conduit 108 so that the circulation set forth above may be repeated or the particles may be passed out of chamber 70 via conduit 110, through valve 210 when it is opened.

During the above described circulation of particles to be coated, crucible 100 is heated and charged with a supply of the coating material whereby vapors of the coating material are circulating within conveyor 78 in intimate contact with the particles as shown by arrows 116. The vapor flows to the inner surface of receptacle 80 where the particles are distributed and thus effectively and efficiently impinges on the particles. Top plate 107 of channel 106 serves as means to direct the vapor onto the inner surface of the rotating conveyor 78.

Although crucible 100 is shown as being resistance heated, it should be apparent that the crucible can be heated by induction, arcing of a consumable electrode, plasma jet or by electron bombardment. It should also be apparent that while only a few particles are shown throughout the system for illustrative purposes, in normal operation the internal face 79 of conveyor 78 would be entirely covered with moving particles. This results in greater efficiency and uniformity than can be achieved with apparatus typified by the vibrating plate construction.

In some instances, it may be found desirable to coat the particles with an alloy, and in such instances the alloy constituents can be evaporated singly or simultaneously in separate crucibles operating at different temperatures.

The particles 10 are uniformly coated by this process because they are continually rotating or rolling in the coating vapor.

To achieve the desired coating temperature for the coating of different materials, the receptacle 80 may be heated or cooled. The heating may be effected by induction coils encircling the receptacle 80 supplied with current of the desired magnitudes and frequency. The cooling may be effected by conducting inert gas back-filled through conductor 75 against the wall of receptacle 80 or by providing this receptacle with a water cooling system. In the latter eventuality the receptacle 80 may be enclosed in a cooling jacket within which it rotates in sealed bearings.

The apparatus shown in FIG. 2 also includes a receptacle 220 rotatable by gears 222 and 224. But in this case the particles 10 are injected by chutes 226 sealed through the top 228 into the apex of the container 220. As in FIG. 1, the bearing on which the rotation takes place is hollow. A rod 230 of the coating material is fed continuously through a vacuum seal (not shown) in the bearing and is vaporized by an electron beam 232 from a beam generator 234 supported in the top 228. The beam generator 234 is provided with the usual beam accelerating and focussing mechanisms and the beam may be pulsed and/or oscillated over the surface of the rod 230 as required. The necessary accelerating, focussing or oscillating mechanisms may also be suspended within the receptacle 220.

The receptacle 220 is provided with a hollow conductor 240 and may be heated by transmission of current (for example high frequency) through the conductor or cooled by cooling fluid through the conductor 240. The conductor may be rotatable with the receptacle and may be connected to the fluid through suitable rotatable seals and to electric power facilities through a commutator.

The coated particles 10 are derived through conduit 242. The derived particles may be recirculated for adequate coating.

While a preferred embodiment has been disclosed herein, many modifications are feasible. This invention then is not to be restricted except insofar as is necessitated by the spirit of the prior art.

I claim as my invention:

1. Apparatus for coating discrete particles with a vaporizable material comprising a gas-tight housing, conveying means having a generally diverging surface disposed within said housing, means disposed within the concavity defined by said diverging surface for vaporizing said material and providing a vapor region contiguous to said surface, said particles being freely disposed in said conveying means with free access to said surface, and means connected to said conveying means for rotating said conveying means to move said particles along said surface under the action of centrifugal force produced by said rotation.

2. The apparatus of claim 1 wherein the diverging surface is roughened to facilitate the rolling of the particles in the vapor contiguous to the surface.

3. The apparatus of claim 1 wherein the vaporizing means includes means for disposing the material to be vaporized deep in the cavity defined by the diverging surface, and means for vaporizing the material deep in said cavity.

4. Apparatus for coating discrete particles with a vaporizable coating material comprising a receptacle having a generally diverging internal surface, said particles being freely disposed in said receptacle with said surface freely accessible to them, means within the cavity defined by said surface for producing a vapor of said material within said cavity, said vapor extending over said surface, driving means coupled to said receptacle for rotating said receptacle with said vapor contiguous to said surface so that said particles roll along said surface and are coated with said material by contact with said vapor over said surface as they roll, and a particle channel means connecting a portion of said surface of lower cross sectional area and a portion of said surface of higher cross sectional area for circulating said particles across said surface.

5. Apparatus for coating discrete particles with a vaporizable coating material comprising a receptacle having a generally diverging internal surface, said particles being freely disposed in said receptacle with said surface freely accesible to them, material disposed near the region from which said surface diverges and means for vaporizing said material to cause vapor to be emitted from said region to extend over said surface contiguous to said surface, and driving means coupled to said receptacle for rotating said receptacle with said vapor contiguous to said surface so that said particles roll along said surface and are coated with said material by contact with said vapor as they roll.

References Cited

UNITED STATES PATENTS

| | | | |
|---|---|---|---|
| 2,938,816 | 5/1960 | Gunther | 117—107 |
| 2,953,484 | 9/1960 | Tellkamp | 117—107 X |
| 3,220,875 | 11/1965 | Queneau | 117—107.1 X |
| 2,398,517 | 4/1946 | Castor | 117—100 |
| 2,599,978 | 6/1952 | Davis et al. | 117—107.1 X |
| 2,990,807 | 7/1961 | Gerow | 117—107.1 X |
| 3,017,854 | 1/1962 | O'Brien | 118—52 X |
| 3,033,159 | 5/1962 | O'Brien | 118—52 X |
| 3,132,967 | 5/1964 | Spraul et al. | 117—101 X |
| 3,133,831 | 5/1964 | Lowe et al. | 118—56 X |
| 3,192,064 | 6/1965 | Cerych et al. | 117—107 X |

RALPH S. KENDALL, *Primary Examiner.*

A. G. GOLIAN, *Assistant Examiner.*

U.S. Cl. X.R

117—101, 107.1; 118—52